(12) United States Patent
Flak et al.

(10) Patent No.: US 7,530,486 B2
(45) Date of Patent: May 12, 2009

(54) APPLICATIONS OF FRICTION STIR WELDING USING A SUPERABRASIVE TOOL

(75) Inventors: Richard A. Flak, Provo, UT (US); Russell Steel, Salem, UT (US); Scott M. Packer, Alpine, UT (US)

(73) Assignees: SII MegaDiamond, Inc., Provo, UT (US); Advanced Metal Products, Inc., West Bountiful, UT (US)

( * ) Notice: Subject to any disclaimer, the term of this patent is extended or adjusted under 35 U.S.C. 154(b) by 36 days.

(21) Appl. No.: 10/839,774

(22) Filed: May 5, 2004

(65) Prior Publication Data

US 2005/0156010 A1 Jul. 21, 2005

Related U.S. Application Data

(60) Provisional application No. 60/467,875, filed on May 5, 2003.

(51) Int. Cl.
*B23K 20/12* (2006.01)

(52) U.S. Cl. .................................. 228/112.1

(58) Field of Classification Search .............. 228/112.1, 228/2.1, 2.3
See application file for complete search history.

(56) References Cited

U.S. PATENT DOCUMENTS

| | | | |
|---|---|---|---|
| 4,144,110 A | 3/1979 | Luc | |
| 5,460,317 A * | 10/1995 | Thomas et al. | 228/112.1 |
| 5,611,479 A | 3/1997 | Rosen | |
| 5,697,511 A | 12/1997 | Bampton | |
| 5,713,507 A * | 2/1998 | Holt et al. | 228/112.1 |
| 5,718,366 A * | 2/1998 | Colligan | 228/112.1 |
| 5,758,999 A | 6/1998 | Geise | |
| 5,769,306 A | 6/1998 | Colligan | |
| 5,794,835 A * | 8/1998 | Colligan et al. | 228/2.1 |
| 5,811,755 A | 9/1998 | McGee | |
| 5,813,592 A | 9/1998 | Midling et al. | |
| 5,829,664 A | 11/1998 | Spinella et al. | |
| 5,971,247 A | 10/1999 | Gentry | |
| 5,971,252 A | 10/1999 | Rosen et al. | |
| 5,975,406 A | 11/1999 | Mahoney et al. | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,070,784 A | 6/2000 | Holt et al. | |
| 6,138,895 A | 10/2000 | Oelgoetz et al. | |

(Continued)

FOREIGN PATENT DOCUMENTS

EP 0 797 043 A2 9/1997

(Continued)

*Primary Examiner*—Kiley Stoner
(74) *Attorney, Agent, or Firm*—Morris O'Bryant Compagni (57) ABSTRACT

The present invention relates to a method of joining segments of high melting temperature materials, that includes frictionally heating a first high melting temperature material and a second high melting temperature material wherein the first high melting temperature material and second high melting temperature material are welded together, without substantially changing the macrostructure and/or the microstructure of the first high melting temperature material and the second high melting temperature material, after application of a frictional force.

15 Claims, 5 Drawing Sheets

U.S. PATENT DOCUMENTS

| | | | |
|---|---|---|---|
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,206,268 B1 | 3/2001 | Mahoney | |
| 6,227,432 B1* | 5/2001 | Enomoto et al. | 228/112.1 |
| 6,264,088 B1* | 7/2001 | Larsson | 228/2.1 |
| 6,585,147 B2* | 7/2003 | Jogan | 228/112.1 |
| 6,669,075 B2* | 12/2003 | Colligan | 228/2.3 |
| 6,708,865 B2* | 3/2004 | Yoshinaga | 228/112.1 |
| 6,708,867 B2* | 3/2004 | Yoshinaga | 228/112.1 |
| 6,722,555 B2* | 4/2004 | Ezumi et al. | 228/112.1 |
| 6,726,084 B2* | 4/2004 | Duncan, Jr. | 228/112.1 |
| 6,758,382 B1* | 7/2004 | Carter | 228/2.1 |
| 6,769,595 B2* | 8/2004 | Stol et al. | 228/112.1 |
| 6,772,935 B2* | 8/2004 | Scheglmann et al. | 228/112.1 |
| 6,779,704 B2* | 8/2004 | Nelson et al. | 228/112.1 |
| 6,779,707 B2* | 8/2004 | Dracup et al. | 228/112.1 |
| 6,793,118 B2 | 9/2004 | Palm | |
| 6,892,924 B2* | 5/2005 | Stevenson et al. | 228/2.1 |
| 6,953,140 B2* | 10/2005 | Park et al. | 228/112.1 |
| 2002/0027155 A1* | 3/2002 | Okamura et al. | 228/112.1 |
| 2003/0028281 A1* | 2/2003 | Adams et al. | 700/212 |
| 2003/0057261 A1* | 3/2003 | Holman et al. | 228/112.1 |
| 2004/0050906 A1* | 3/2004 | Rice et al. | 228/112.1 |
| 2004/0074944 A1* | 4/2004 | Okamoto et al. | 228/2.1 |
| 2004/0074948 A1* | 4/2004 | Kusunoki et al. | 228/112.1 |

FOREIGN PATENT DOCUMENTS

| | | |
|---|---|---|
| EP | 0 810 054 A1 | 12/1997 |
| EP | 0 833 097 A2 | 4/1998 |
| EP | 0 867 254 A1 | 9/1998 |
| EP | 0 810 056 A3 | 12/1998 |
| EP | 0 888 843 A1 | 1/1999 |
| EP | 0 893 189 A2 | 1/1999 |
| EP | 0 893 190 A2 | 1/1999 |
| EP | 0 925 964 A2 | 6/1999 |
| EP | 0 928 659 A1 | 7/1999 |
| EP | 0 947 280 A1 | 10/1999 |
| EP | 0 810 055 B1 | 12/1999 |
| EP | 0 968 788 A2 | 1/2000 |
| EP | 0 972 605 A2 | 1/2000 |
| EP | 0 985 483 A2 | 3/2000 |
| EP | 0 992 314 A2 | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 306 366 A | 5/1997 |
| JP | 2002-035965 A * | 2/2002 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | WO 98/45080 | 10/1998 |
| WO | WO 98/51441 | 11/1998 |
| WO | WO 98/58759 | 12/1998 |
| WO | WO 99/32254 | 7/1999 |
| WO | WO 99/32255 | 7/1999 |
| WO | WO 99/33594 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |

* cited by examiner

A—Base Metal 500X

B—TMAZ 500X

C—DXZ 500X

APPLICATIONS OF FRICTION STIR WELDING USING A SUPERABRASIVE TOOL

CROSS REFERENCE TO RELATED APPLICATIONS

This document claims priority to, and incorporates by reference all of the subject matter included in the provisional patent application, having Ser. No. 60/467,875 and filed on May 5, 2003.

BACKGROUND OF THE INVENTION

1. Field of the Invention

The invention relates generally to friction stir welding of high melting temperature materials. More specifically, the present invention teaches a method and apparatus for joining high melting temperature materials in a friction stir welding process, without substantially changing the macrostructure and the microstructure of those materials.

2. Description of Related Art

Friction stir welding (hereinafter referred to as "FSW") is a technology that has been developed for welding metals, metal alloys, and other materials. The friction stir welding process often involves engaging the material of two adjoining workpieces on either side of a joint by a rotating stir pin or spindle. Force is exerted to urge the spindle and the workpieces together and frictional heating caused by the interaction between the spindle and the workpieces results in plasticization of the material on either side of the joint. The spindle is traversed along the joint, plasticizing material as it advances, and the plasticized material left in the wake of the advancing spindle cools and solidifies to form a weld.

It will be appreciated that large forces must be exerted between the spindle and the workpieces in order to apply sufficient pressure to the workpieces to cause plasticization of the material. For instance, for friction stir welding an aluminum alloy workpiece of ¼-inch thickness, forces of up to 4000 pounds or more may have to be exerted between the spindle and the workpiece. In a conventional friction stir welding process, these large forces are absorbed at least partially by a back-up member or anvil which engages the workpieces on the "back side" of the weld opposite the spindle. Where the workpieces have sufficient structural strength and rigidity, some of the force may be absorbed by the workpieces themselves. However, in many cases the workpieces are semi-flexible structures that are incapable of Supporting and absorbing the large forces involved in a friction stir welding process. Accordingly, the back-up member is usually supported by a substantial support structure.

Another example of friction welding occurs when the ends of two pipes are pressed together while one pipe is rigidly held in place, and the other is pressed against it and turned. As heat is generated by friction, the ends of the pipes become plasticized. By quickly stopping rotation of the pipes, the two pipes fuse together. Note that in this case, the frictional heating is caused by the relative motion of the two parts to be joined.

Figure 1:
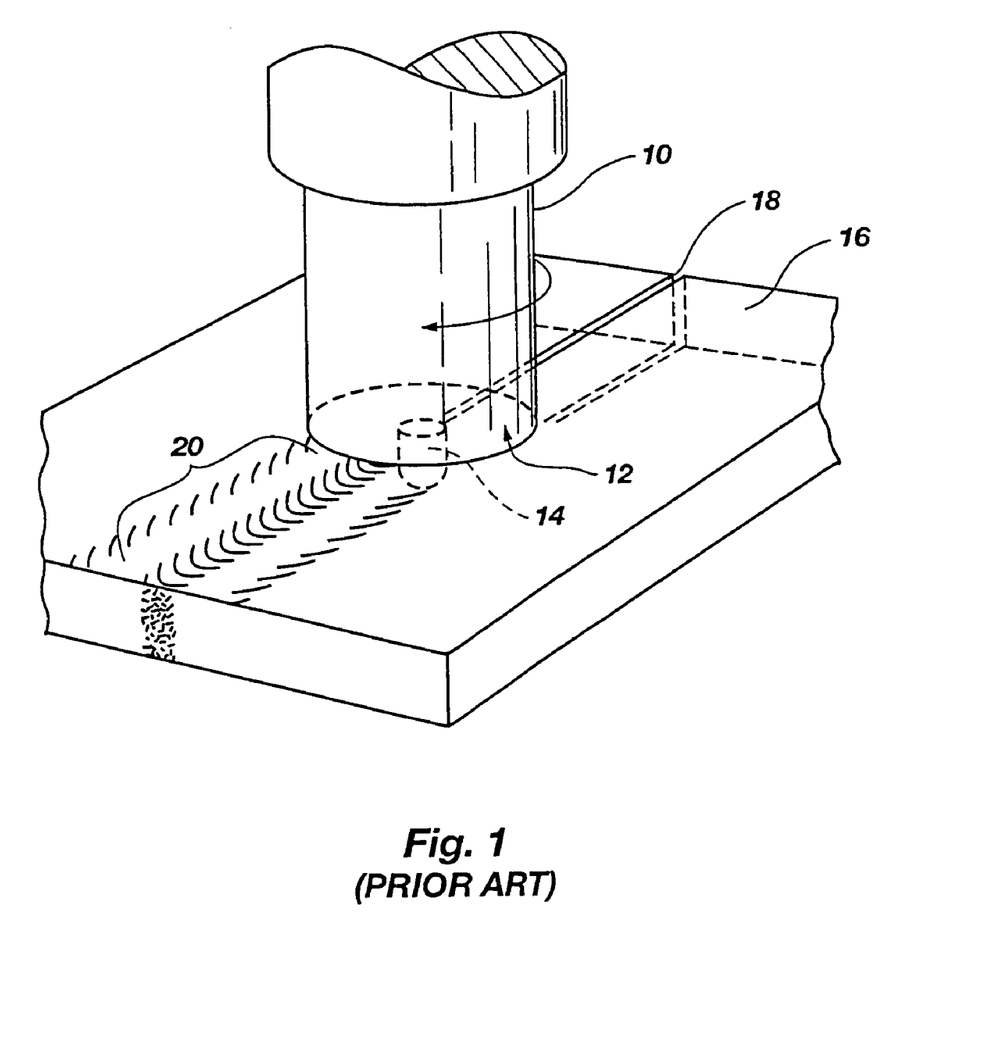
FIG. 1 is a perspective view of a prior art friction stir welding tool.

FIG. 1 is a perspective view of a tool being used for friction stir butt welding that is characterized by a generally cylindrical tool 10 having a shoulder 12 and a pin 14 extending outward from the shoulder. The pin 14 is rotated against a workpiece 16 until sufficient heat is generated, at which point the pin of the tool is plunged into the plasticized workpiece material. The workpiece 16 is often two sheets or plates of material that are butted together at a joint line 18. The pin 14 is plunged into the workpiece 16 at the joint line 18.

The frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that is generally indistinguishable from the workpiece material 16 itself.

A number of prior art friction stir welding patents disclose various tooling and techniques to obtain welds that have beneficial characteristics over contemporary fusion welding processes. These benefits include low distortion in long welds, no fumes, no porosity, no splatter, and excellent mechanical properties regarding tensile strength. The process is especially useful for preventing significant heat damage or otherwise altering the properties of the original material being welded.

However, while friction stir welding is a very advantageous technique for welding non-ferrous alloys such as aluminum, brass and bronze, typical prior art friction stir welding tools are not capable of functionally welding materials having higher melting points. It should be understood that functionally weldable materials are those that are weldable using friction stir welding in more than nominal lengths, and without destroying the tool.

A particular type of material that would be desirable to friction stir welding and which has broad industrial applications, are ferrous alloys. Ferrous alloys include steel and stainless steel. Another class of materials that would be desirable to friction stir weld, have broad industrial applications, have a higher melting point than ferrous alloys, and either have a small amount of iron or none, are the superalloys. Superalloys are nickel-, iron-nickel, and cobalt-base alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other nonferrous materials.

These materials, which are described herein as "high melting temperature materials," have particular use in the energy industry, which uses long segments of pipe (typically broken into 40 foot segments for shipping purposes), which must then be assembled into longer segments.

As noted above, prior methods and apparatuses for friction stir welding have been unable to join these high melting temperature materials. Accordingly, more traditional methods such as plasma welding have been used to join these materials. A state of the art prior art approach starts with steel plate that is pressed in several stages into a round tube so that the edges touch, then uses double submerged arc welding (DSW) arrayed generally in a gang of welding heads to weld the edges together along the axis, generally in 40 foot sections. Metalurgically, however, this process changes the microstructure of the steel, which can cause failure of the welds in certain applications. In particular, this method will convert the steel from a wrought microstructure to a cast microstructure.

What is needed, therefore, are techniques for joining these high melting temperature materials, without substantially changing the macrostructure and/or the microstructure of the materials, as these changes tend to result in poor performance.

BRIEF SUMMARY OF THE INVENTION

It is an object of the present invention to provide a system and method for functionally friction stir welding high melting temperature materials in a manner that does not materially alter the macrostructure of the materials.

It is another object to provide a system and method for functionally friction stir welding high melting temperature materials in a manner that does not materially alter the microstructure of the materials.

It is another object to provide a system and method for functionally friction stir welding high melting temperature materials in a manner that does not destroy the tool to thereby weld more than nominal lengths of the materials.

It is another object to provide a system and method for functionally friction stir welding two different high melting temperature materials to thereby obtain alloying In a preferred embodiment, the present invention is a method of joining segments of high melting temperature materials, that includes frictionally heating a first high melting temperature material and a second high melting temperature material wherein the first high melting temperature material and second high melting temperature material are welded together, without substantially changing the macrostructure and/or the microstructure of the first high melting temperature material and the second high melting temperature material, after application of a frictional force.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention relates to a method for joining high melting temperature materials without substantially changing the microstructure of the high melting temperature materials. In particular, the present application relates to methods and apparatus for joining segments of drill casing and line pipe. In addition, the present invention discloses methods for joining segments of stainless steel and nickel base alloys. SAF 2507 duplex stainless steel (available commercial from Oceans International) has also been successfully friction stir welded, with the retention of both phases which make up the metallurgy of the material.

U.S. Patent Published Application No. 2002/0011509, discloses a tool for friction stir welding that incorporates superabrasive materials in a pin and a shoulder, to enable friction stir welding of higher melting materials. This application is incorporated by reference herein in its entirety.

Some highlights of this tool are as follows. The tool incorporates superabrasive materials in a pin and shoulder, and utilizes thermal management within the tool, to enable friction stir welding of materials that are presently functionally unweldable. Thus, the present invention makes possible long, continuous, and uninterrupted welds of MMCs, ferrous alloys, and superalloys without suffering significant degradation of the tool.

The pin and the shoulder at least include a coating comprised of a superabrasive material, the pin and shoulder being designed to reduce stress risers, disposing a collar around a portion of the shoulder and the shank to thereby inhibit rotational movement of the shoulder relative to the shank, and incorporating thermal management by providing a thermal flow barrier between the shoulder and the shank, and between the collar and the tool.

The shank, shoulder, and pin are separate components that are coupled together to form the friction stir welding tool, wherein the shoulder and the shank include a superabrasive coating. Alternatively, the shank and the shoulder are a monolithic element including a superabrasive coating over at least a portion thereof, and having a separate pin with a superabrasive coating. Alternatively, the shank, shoulder and pin are a monolithic element having a superabrasive coating covering at least a portion thereof.

In another aspect of the tool, thermal management of heat using thermal flow barriers within the tool enables sufficient heat to be generated at the pin to enable friction stir welding, while protecting a tool holder from heat damage.

Stress risers are reduced on the pin, larger radii are provided on the shoulder, and pin diameter is increased to thereby enable friction stir welding of MMCs, ferrous alloys, and superalloys.

In another aspect of the tool, the tool includes at least one CVD, ion-beam implanted, and/or PVD coating disposed over the superabrasive coating to thereby increase resistance to chemical and mechanical wear.

In another aspect of the tool, the superabrasive coating is selected based upon a desired balance between chemical wear and mechanical wear. The superabrasive coating is also selected based upon the characteristic of having a low coefficient of friction that prevents the workpiece material from adhering to the tool, thereby reducing wear of the tool.

Figure 2A:
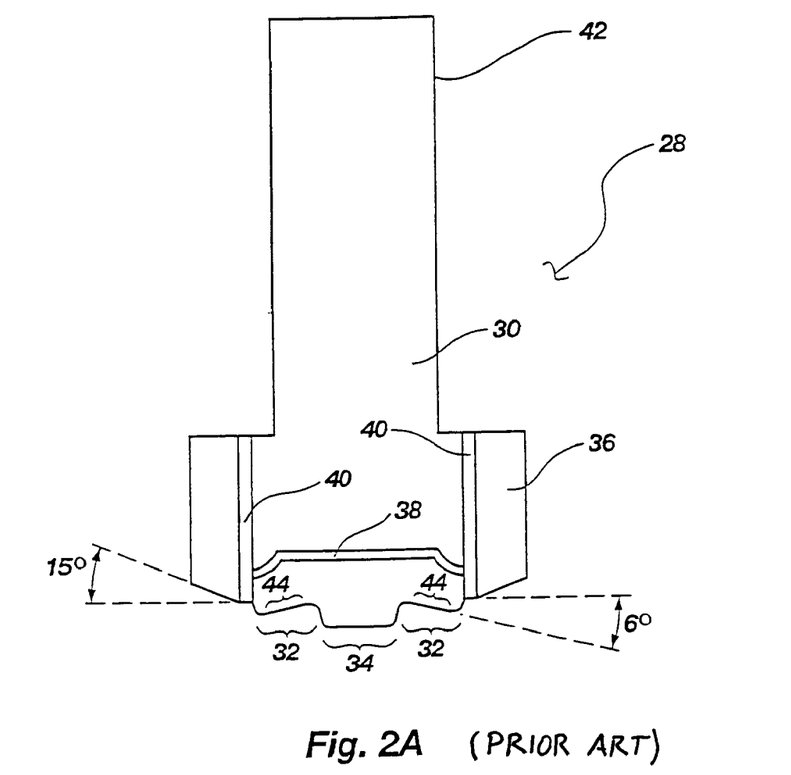
FIG. 2A shows a cross-sectional profile view of a friction stir welding tool used in accordance with one embodiment of the present invention.

FIG. 2A is a cross-sectional profile view of a friction stir welding tool 28 formed in accordance with an embodiment of the present invention. In FIG. 2A, the tool 28 includes a shank 30 that is generally cylindrical. Coupled to the shank 30 is a shoulder 32 with an integral pin 34. Coupled around a portion of the shank 30 and the shoulder 32 with an integral pin 34 is a collar 36. Disposed between the shank 30 and the shoulder 32 with an integral pin 34 is a thermal flow barrier 38. There is also a thermal flow barrier 40 disposed between the collar 36 and a portion of the shank 30, as well as the shoulder 32 with an integral pin 34.

The shank 30 is preferably formed from cemented tungsten carbide. Cemented tungsten carbide is selected for its strength, and for its high thermal conductivity that allows proper cooling of the shank to maintain its strength relative to the other materials used in the tool 28. However, those of ordinary skill in the art will recognize that other materials may be used for the shank, and no limitation on the scope of the present invention is intended.

In order to weld the high melting materials used in the present invention, the pin 34 and the shoulder 32 are coated with a superabrasive material. In a one embodiment, polycrystalline cubic boron nitride (PCBN) is used as a superabrasive coating on a substrate material being used for the shoulder 32 with the integral pin 34. In a preferred embodiment, rather than a coating, the shoulder 32 and the pin 34 (which mayor may not be integrally formed with the shoulder) are formed of polycrystalline cubic boron nitride themselves, rather than being coated.

A method for creating a superabrasive tool is described in detail in U.S. Published Patent application No. 2002/0011509, which is incorporated herein in its entirety.

Regarding pin diameter, the pin 34 of the preferred embodiment has a generally larger diameter than is typically used in conventional tools. The pin diameter may be expressed as a ratio of pin diameter compared to pin length. In a preferred embodiment, the range of ratios extends from 0.2:1 to 30:1.

It is also noted that the shoulder 32 is not shown as a flat surface relative to a workpiece. The shoulder 32 is in fact concave. This shape enables the plasticized workpiece material to be more easily displaced and flow around the pin 34. The concave shape also forces the plasticized workpiece material back into the workpiece.

Although a relatively flat region 44 is shown between the outer and inner radii of the shoulder 32, this region 44 can also be curved to form a concave or a convex surface. Alternatively, the shoulder 32 can also be convex or flat relative to the workpiece. The friction stir welding process requires that a tool holder press down on the tool 28. This axial pressure is generally sufficient to hold the components (pin 30, shoulder 32, shank 34) together in the axial direction. However, other methods may be used to "lock" the components together, or the components may be formed as an integral piece.

Figure 2B:
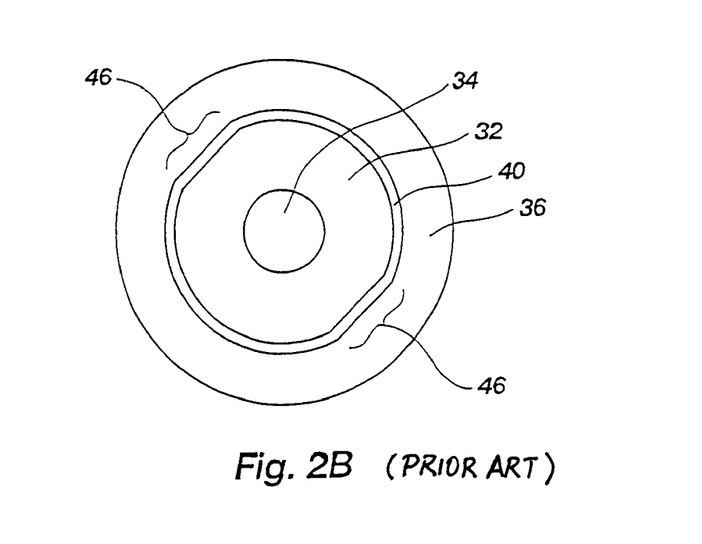
FIG. 2B shows an end view of the tool shown in FIG. 2A.

FIG. 2B is provided as an end-view of the tool 28. The materials that are visible from this perspective are the pin 34, the shoulder 32, the thermal flow barrier 40, and the collar 36.

Dimensions of the preferred embodiment are only useful as an example, but will be provided. The diameter of the pin is 0.37". The diameter of the shoulder is 1". The thickness of the titanium alloy thermal barriers 38, 40 is 0.060", and the diameter of the collar 36 is 1.63". The angle on the collar 36 is shown as 15 degrees, and the angle of the shoulder is shown as 6 degrees. These figures are for illustration purposes only, and should not be considered limiting.

Figure 3:
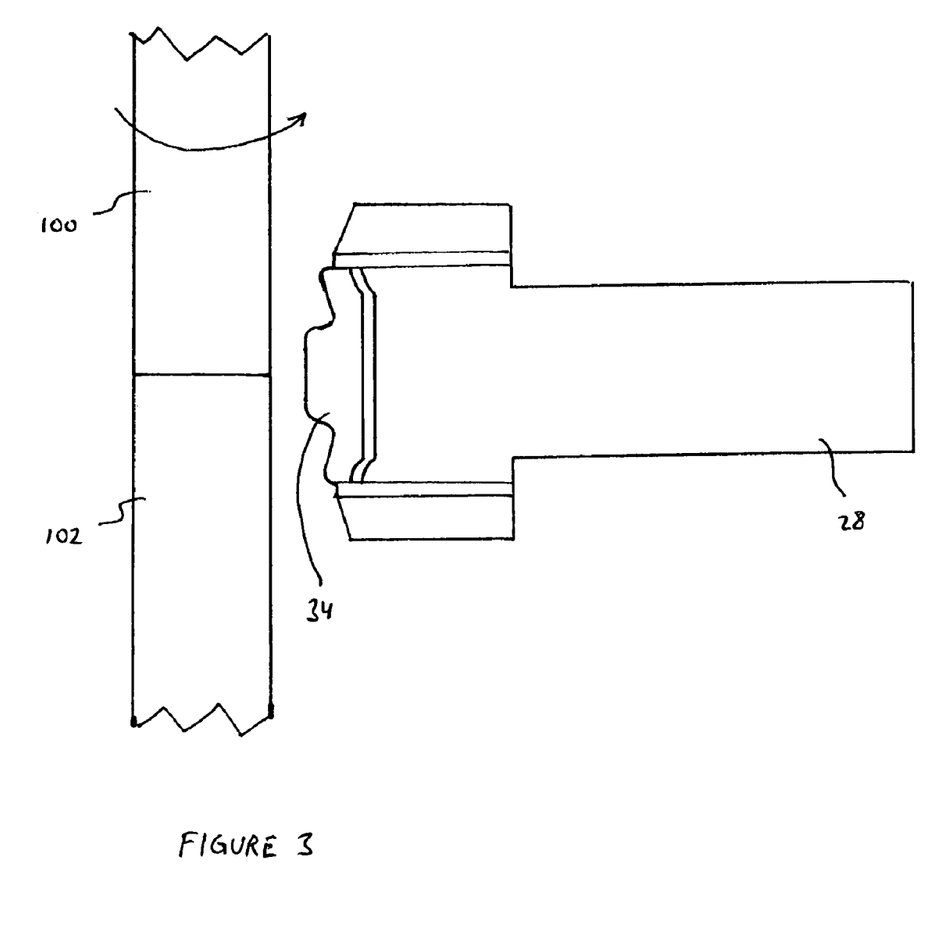
FIG. 3 shows one application in-accordance with the present invention.

FIG. 3 shows the tool 28 described in FIGS. 2A and 2B used in an application in accordance with the present invention. In FIG. 3, the tool 28 is arranged such that the pin 34 is adjacent two pipe sections (100 and 102) to be joined. In a preferred embodiment, the pipe sections 100, 102 are mounted on an apparatus (not shown) that rotates the pipe sections together, such that as the pin 34 is plunged into the seam to be welded, a continuous weld can take place. That is, the tool 28 remains stationary (except for the rotation of the pin and shoulder), while the sections of pipe are rotated throughout 360 degrees, so that a complete weld can be formed. In this manner, large segments of pipe can be joined quickly.

In an alternative embodiment, the pipe 100, 102 remains stationary, and the tool 28 is rotated around the pipe.

In a preferred application, a forty-foot section of stainless steel plate is pressed in several stages into a round tube so that the edges touch. Then, a superabrasive tool is used to join the edges together by friction stir welding. In other applications (which may use titanium, superalloys, and other non-ferrous and ferrous metals), more than one superabrasive tool (or pin) may be used simultaneously. For example, tools may be run on the inside and outside of a weld position, in order to join both the inside and outside of a pipe. Further, portable tools may be used, to provide welds or repairs in the field. It is understood by those of ordinary skill in the art, that this application is not limited to a stainless steel section of plate, but rather may be generically applied to weld any suitable high-melting temperature materials.

Also preferably, an inert gas is passed over the surface of the workpieces during friction stir welding. The inert gas, such as argon, helps to prevent oxidation of the workpieces during friction stir welding. Because of the heat and pressures used in friction stir welding, many metal materials undergo an oxidation reaction during friction stir welding. The resulting metal oxide may be significantly more brittle than the base metal, resulting in a weaker weld. By passing an inert gas over the surface being welded, the oxidation reaction can be reduced, simply by depriving the metal of oxygen that is necessary for the reaction. Gas can be passed over the surface through the friction stir welding tool itself, or by any suitable method.

As a test, two pieces of AS1M A53A "black pipe," having a diameter of four inches and a thickness of 0.2 inches were mounted on a fixture capable of being rotated. A superabrasive tool (having the geometries and compositions described above) was rotated a 400 RPM at a feed rate of 102 millimeters per minute. Further, a shielding gas of argon was passed over the pipe at a rate of 23.6 liters per minute. The pin of the superabrasive tool was plunged into the seam, and the pipe was rotated around 360 degrees. During the welding process, the macrostructure and microstructure of the pipe was investigated.

Figure 4A:
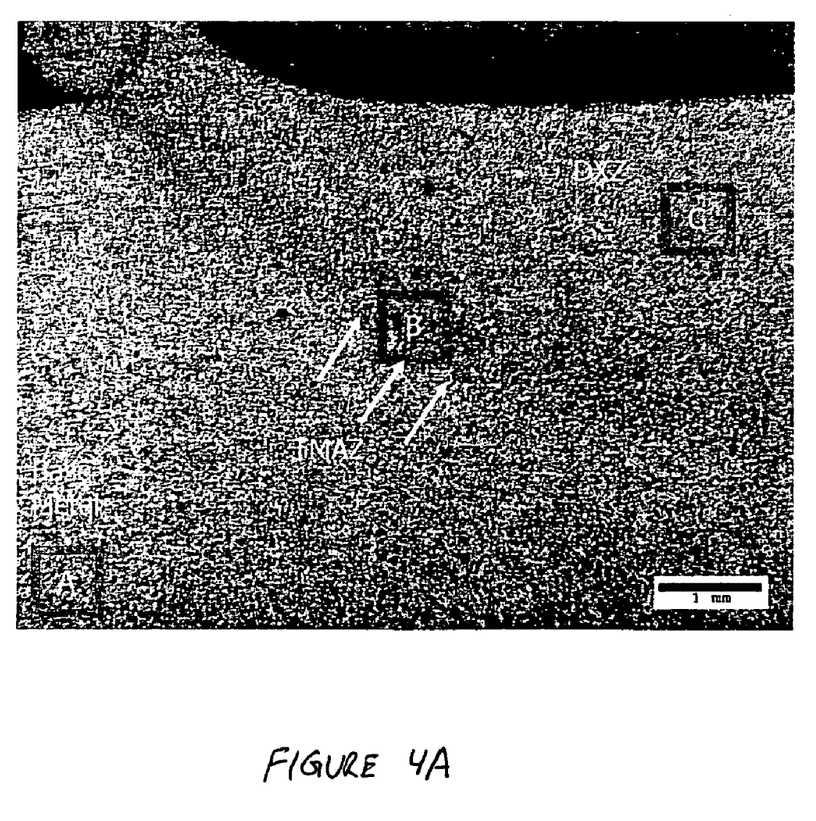
FIGS. 4A and 4B show the effect of one embodiment of the present invention on the macrostructure and microstructure of steel pipe.
Figure 4B:
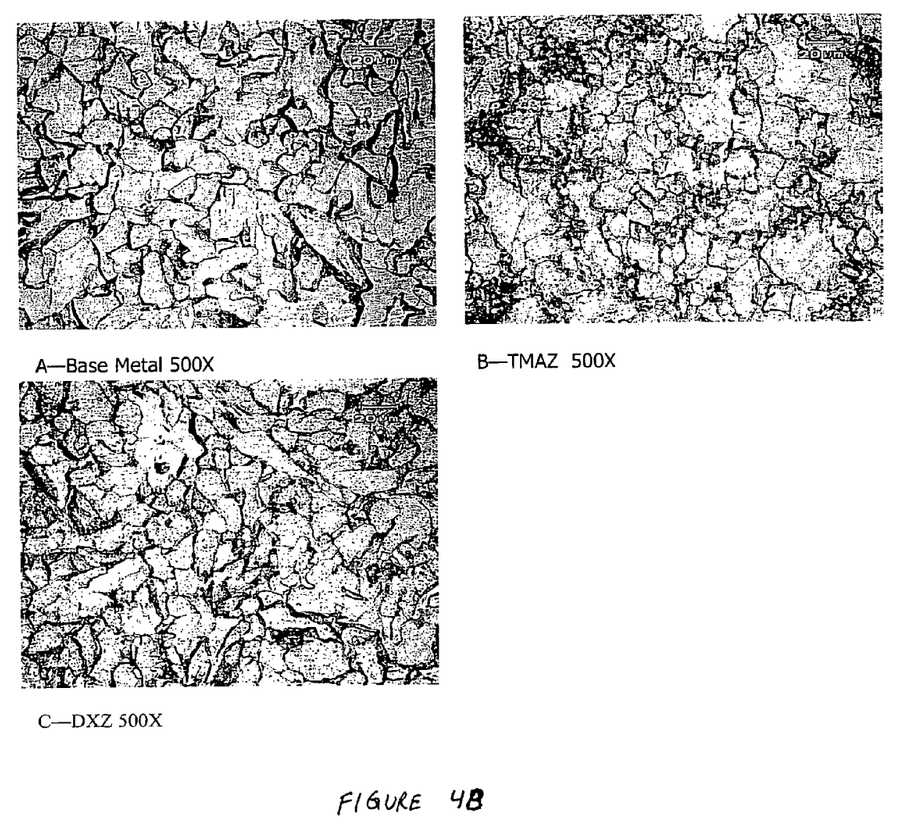

FIGS. 4A and 4B show the results of this investigation. In FIG. 4A, the macrostructure of the pipe is shown, with reference to three regions (A, B, and C). Region A shows the base metal (i.e., the pipe located side the rotating pin), region B shows the adjacent to A, but has not yet re-crystallized (the "thermally mechanically affected zone" or TMAZ), and region C shows the region having already re-crystallized (the "dynamic re-crystallized zone "DXZ").

FIG. 4A also shows the average hardness of the three regions, which was found to be 277 for the base metal; 270 for TMAZ; and 272 for DXZ. These results illustrate that on a macro crystalline level, the properties of the steel in this example have not been substantially affected by the friction stir welding.

FIG. 4B shows the microcrystalline structure of the same three regions during the welding process. FIG. 4B shows that the base metal and DXZ have roughly the same sized crystals. Further, FIG. 4B illustrates that even after friction stir welding the underlying wrought crystal structure remains substantially intact. Advantageously, therefore, the overall strength of the steel is not reduced, providing a stronger finished product as compared to prior art methods, which can result in the formation of a cast microstructure.

It should be noted that many useful pin geometries and tools can be adapted in accordance with the principles of the present invention. For example, tools having pins of adjustable length can provide many benefits. The tools must be modified to reduce stress risers, either, coated on the shoulder and pin with superabrasive materials or manufactured from solid superabrasive materials, and utilize thermal management techniques as taught in the present invention. In another embodiment, motions in addition to the rotary motion and transverse travel in the direction of the weld may be imposed on the FSW tool.

In particular, it is expressly within the scope of the present invention that the FSW tool may include up and down reciprocating motion (to allow welding of material having different thicknesses), side-to-side motions, percussive motions and/or front-to-back motions.

In another embodiment, the superabrasive tool may be used as part of an apparatus to effect friction stir welding (FSW) along a circumferential path to join two pipes. As noted above, the superabrasive tool may comprise an integrally formed pin and shoulder formed from polycrystalline cubic boron nitride, for example. Such an apparatus is denoted an "orbital FSW system" because the circumferential motion of the FSW head is similar to the motions of welding heads in commercial orbital fusion welding systems.

Unlike fusion welding, FSW involves large forces between the welding head and the workpieces. It is necessary to react to these forces to prevent the workpieces from moving. In other words, a diametrically opposite force may need to be provided opposite the pin of the FSW tool in order to prevent the pin from collapsing or otherwise distorting the workpiece.

For example, when the workpieces are pipes, they must be supported from within by some type of anvil to prevent them from collapsing or undergoing undesired changes in shape when FSW forces are applied. In this embodiment, the superabrasive containing tool provides the required motions of the FSW head plus the necessary support and reaction forces.

In this embodiment, a superabrasive shouldered pin tool is plunged into the workpieces up to its shoulder with a controlled tilt and is rotated while being pushed or moved along the weld joint. The workpiece material under the tool becomes frictionally heated to plasticity, stirred, and, pushed into place as the tool moves along, leaving behind the welded joint.

Further, in certain embodiments, the super abrasive tool is a retractable pin tool that can be actuated electrically, hydraulically, or pneumatically. The FSW head is mounted diametrically opposite an external reactive roller on an external rotating assembly that would include circumferential driven gears in engagement with driving gears actuated by a motor. A roller assembly fixed to the sections of pipe to be joined keeps the external rotating assembly concentric with the pipes while allowing this assembly to rotate.

The apparatus further includes internal reactive rollers located on the same diametral line as that of the superabrasive FSW head and the external reactive roller. The internal reactive rollers may be driven to rotate along with the external rotating assembly in order to maintain this alignment. Thus, the internal reactive rollers are positioned to react to a diametrical FSW load and thereby prevent distortion of the pipes. The superabrasive apparatus may also be used to FSW solid rods, in which case the internal reactive rollers would not be needed or used.

Superimposition of at least one degree of motion in addition to rotation improves material flow and increases the rate of friction stir welding. The additional motion or motions, increases the amount of energy being transmitted to the workpieces, resulting in the workpieces reaching the plasticized state more quickly. The superimposed motion may be used with the transition plate described above, but also may be used to improve material flow and increase the rate of "conventional" friction stir welding. In another embodiment, a FSW tool may have a non-parallel path with respect to the seam to be welded together.

Further, it is expressly within the scope of the present invention that other FSW techniques, known to those in the art, may be used in conjunction with the techniques described herein.

It is noted that the two workpieces being joined might also be two different high melting temperature materials. Thus, the FSW process would create a new alloy at the weld that has properties that are unique, but a mixture of the two parent workpieces.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for friction stir welding high melting temperature materials by applying at least one additional degree of motion to a friction stir welding tool, said method comprising:

providing a friction stir welding tool wherein the friction stir welding tool is capable of functionally friction stir welding high melting temperature materials by applying standard friction stir welding motions defined as rotational movement, vertical movement defined as plunging into and removal of the tool from the materials, and transverse travel of the friction stir welding tool;

functionally friction stir welding two high melting temperature workpieces using the friction stir welding tool;

superimposing during friction stir welding by active application of direct force on the friction stir welding tool at least one additional degree of motion on the rotational motion by introducing through direct force to the friction stir welding tool a reciprocating up-and-down motion relative to the workpiece that is a function of increased energy transmission to the workpieces and not thickness thereof, in addition to the standard friction stir welding motions, said direct force causing the tool to regularly repeat the reciprocating up-and-down motion to thereby increase the amount of energy being directed to the process of friction stir welding;

introducing side-to-side motion, relative to the workpiece, in addition to the standard friction stir welding motions; and producing a friction stir weld between the two workpieces.

2. A method for friction stir welding high melting temperature materials by applying at least one additional degree of motion to a friction stir welding tool, said method comprising:

providing a friction stir welding tool wherein the friction stir welding tool is capable of functionally friction stir welding high melting temperature materials by applying standard friction stir welding motions defined as rotational movement, vertical movement defined as plunging into and removal of the tool from the materials, and transverse travel of the friction stir welding tool;

functionally friction stir welding two high melting temperature workpieces using the friction stir welding tool;

superimposing during friction stir welding by application of direct force on the friction stir welding tool at least one additional degree of motion on the rotational motion by introducing percussive motion, relative to the workpiece, in addition to the standard friction stir welding motions, said direct force causing the tool to regularly repeat the percussive motion to thereby increase the amount of energy being directed to the process of friction stir welding; and producing a friction stir weld between the two workpieces.

3. A method for friction stir welding high melting temperature materials by applying at least one additional degree of motion to a friction stir welding tool, said method comprising:

providing a friction stir welding tool wherein the friction stir welding tool is capable of functionally friction stir welding high melting temperature materials by applying standard friction stir welding motions defined as rotational movement, vertical movement defined as plunging into and removal of the tool from the materials, and transverse travel of the friction stir welding tool;

functionally friction stir welding two high melting temperature workpieces using the friction stir welding tool;

superimposing during friction stir welding by active application of direct force on the friction stir welding tool at least one additional degree of motion on the rotational motion by introducing through direct force to the friction stir welding tool a reciprocating up-and-down motion relative to the workpiece that is a function of increased energy transmission to the workpieces and not thickness thereof, in addition to the standard friction stir welding motions, said direct force causing the tool to regularly repeat the reciprocating up-and-down motion to thereby increase the amount of energy being directed to the process of friction stir welding;

introducing front-to-back motion, relative to the workpiece, in addition to the standard friction stir welding; and producing a friction stir weld between the two workpieces.

4. A method for friction stir welding high melting temperature materials by applying at least one additional degree of motion to a friction stir welding tool, said method comprising:

providing a friction stir welding tool wherein the friction stir welding tool is capable of functionally friction stir welding high melting temperature materials by applying standard friction stir welding motions defined as rotational movement, vertical movement defined as plunging into and removal of the tool from the materials, and transverse travel of the friction stir welding tool;

functionally friction stir welding two high melting temperature workpieces using the friction stir welding tool;

superimposing during friction stir welding by active application of direct force on the friction stir welding tool at least one additional degree of motion on the rotational motion by introducing through direct force to the friction stir welding tool a reciprocating up-and-down motion relative to the workpiece that is a function of increased energy transmission to the workpieces and not thickness thereof, in addition to the standard friction stir welding motions, said direct force causing the tool to regularly repeat the reciprocating up-and-down motion to thereby increase the amount of energy being directed to the process of friction stir welding;

creating a path for the friction stir welding tool that includes portions that are not in-line with a weld seam to thereby improve a flow of material at a friction stir welding location; and producing a friction stir weld between the two workpieces.

5. The method as defined in claim 4 wherein the method further comprises introducing an inert gas at a friction stir welding location to thereby prevent oxidation at the friction stir welding location by preventing oxygen from reaching the friction stir welding location.

6. A method for friction stir welding high melting temperature materials by applying at least one additional degree of motion to a friction stir welding tool, said method comprising:

providing a friction stir welding tool wherein the friction stir welding tool is capable of functionally friction stir welding high melting temperature materials by applying standard friction stir welding motions defined as rotational movement, vertical movement defined as plunging into and removal of the tool from the materials, and transverse travel of the friction stir welding tool;

functionally friction stir welding two high melting temperature workpieces using the friction stir welding tool;

superimposing during friction stir welding by application of direct force on the friction stir welding tool a side-to-side motion on the rotational motion relative to the workpiece that is not one of the four standard friction stir welding motions, said direct force causing the tool to regularly repeat the side-to-side motion to thereby increase the amount of energy being directed to the process of friction stir welding;

introducing through active application of direct force to the friction stir welding tool a regularly repeating reciprocating up-and-down motion relative to the workpiece that is a function of increased energy transmission to the workpieces and not thickness thereof, in addition to the standard friction stir welding motions and the side-to-side motion and, producing a friction stir weld between the two workpieces.

7. A method for friction stir welding high melting temperature materials by applying at least one additional degree of motion to a friction stir welding tool, said method comprising:

providing a friction stir welding tool wherein the friction stir welding tool is capable of functionally friction stir welding high melting temperature materials by applying standard friction stir welding motions defined as rotational movement, vertical movement defined as plunging into and removal of the tool from the materials, and transverse travel of the friction stir welding tool;

functionally friction stir welding two high melting temperature workpieces using the friction stir welding tool;

superimposing during friction stir welding by application of direct force on the friction stir welding tool a side-to-side motion on the rotational motion relative to the workpiece that is not one of the four standard friction stir welding motions, said direct force causing the tool to regularly repeat the side-to-side motion to thereby increase the amount of energy being directed to the process of friction stir welding;

introducing percussive motion, relative to the workpiece, in addition to the standard friction stir welding motions and the side-to-side motion and, producing a friction stir weld between the two workpieces.

8. The method as defined in claim 6 wherein increasing the amount of energy directed to the process of friction stir welding further comprises introducing front-to-back motion, relative to the workpiece, in addition to the standard friction stir welding motions and the side-to-side motion.

9. The method as defined in claim 6 wherein the method further comprises creating a path for the friction stir welding tool that includes portions that are not in-line with a weld seam to thereby improve a flow of material at a friction stir welding location.

10. The method as defined in claim 2 wherein increasing the amount of energy directed to the process of friction stir welding further comprises introducing side-to-side motion, relative to the workpiece, in addition to the standard friction stir welding motions.

11. The method as defined in claim 2 wherein increasing the amount of energy directed to the process of friction stir welding further comprises introducing front-to-back motion, relative to the workpiece, in addition to the standard friction stir welding motions.

12. The method as defined in claim 2 wherein the method further comprises introducing an inert gas at a friction stir welding location to thereby prevent oxidation at the friction stir welding location by preventing oxygen from reaching the friction stir welding location.

13. The method as defined in claim 2 wherein the method further comprises creating a path for the friction stir welding tool that includes portions that are not in-line with a weld seam to thereby improve a flow of material at a friction stir welding location.

14. The method as defined in claim 7 wherein increasing the amount of energy directed to the process of friction stir welding further comprises introducing front-to-back motion, relative to the workpiece, in addition to the standard friction stir welding motions and the side-to-side motion.

15. The method as defined in claim 7 wherein the method further comprises creating a path for the friction stir welding tool that includes portions that are not in-line with a weld seam to thereby improve a flow of material at a friction stir welding location.

\* \* \* \* \*